G. W. STEPHENS.
JAW TRAP.
APPLICATION FILED MAY 15, 1918.
1,279,782.
Patented Sept. 24, 1918.
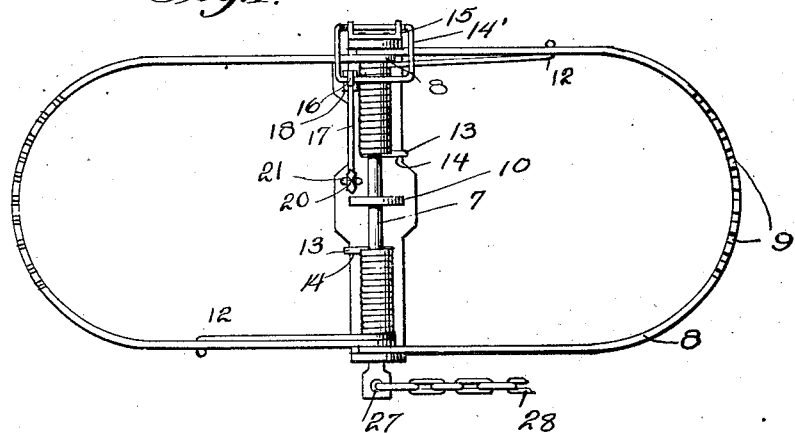
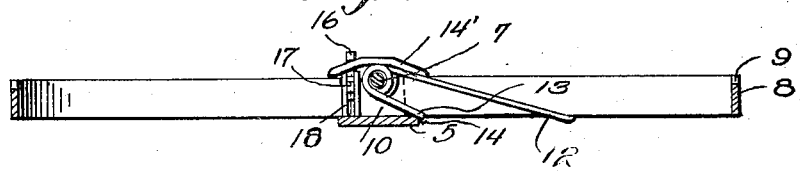
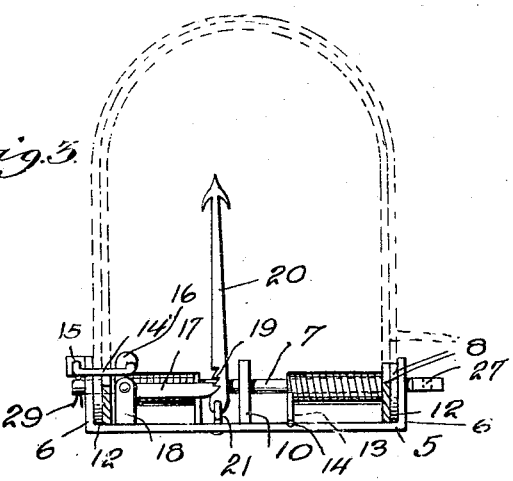
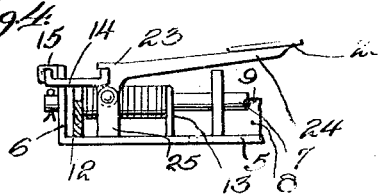
Witness
Ernest C. Craker
J. A. Ratcliff
Inventor
G. W. Stephens
Chandler & Chandler
Attorney

UNITED STATES PATENT OFFICE.

GLENDON W. STEPHENS, OF RUMFORD, MAINE.

JAW-TRAP.

1,279,782.

Specification of Letters Patent.

Patented Sept. 24, 1918.

Application filed May 15, 1918. Serial No. 234,676.

*To all whom it may concern:*

Be it known that I, GLENDON W. STEPHENS, a citizen of the United States, residing at Rumford, in the county of Oxford, State of Maine, have invented certain new and useful Improvements in Jaw-Traps; and I do hereby declare the following to be a full, clear, and exact description of the invention, such as will enable others skilled in the art to which it appertains to make and use the same.

The present invention relates to new and useful improvements in animal traps, more particularly of that type including a pair of pivotally connected jaws adapted to be held apart against the influence of a closing spring by a trigger controlled member.

It is in general the object of the present invention to simplify and otherwise improve the structure and to increase the efficiency of traps of this character, and the ease with which said traps may be manipulated.

A more detailed and important object resides in the provision of an improved spring means for springing the jaws together, which is housed entirely within the confines of the jaws.

A further object resides in the provision of a trigger arrangement for the trap avoiding the possibility of inoperativeness due to accumulations of snow or ice thereon.

With the above and other objects and advantages in view, the invention resides more particularly in the novel combination, formation and arrangement of parts hereinafter described and particularly pointed out in the appended claims.

In the accompanying drawings:

Figure 1 is a plan view of the trap in setting position.

Fig. 2 is a vertical sectional view therethrough on a plane including the pivoted shaft of the jaws.

Fig. 3 is a transverse sectional view on the line 3—3 of Fig. 1, the sprung position of the jaws being indicated in dotted lines.

Fig. 4 is a detail view showing an ordinary bait pan trigger associated with the present trap.

Referring now more particularly to the accompanying drawings, there is provided an elongated base plate 5 having its end portions upwardly directed to form bearing ears 6 for a pivot shaft 7 on which, adjacent its ends, are pivotally mounted the ends of a pair of U-shaped jaws 8, said jaw ends being laterally offset whereby when the jaws are swung together they may lie in parallel relation to afford a proper gripping action, and the bight portions of the jaws are preferably toothed as at 9. The shaft 7 and base plate 5 are mutually braced at their central portions by a connecting plate 10. It is noted that each pair of adjacent ends of the jaw legs is mounted immediately inwardly of the bearing ears 6, and for springing said jaws together coil springs 11 are mounted on the shaft, each having its outer end extended and hooked at 12 under the adjacent legs of its other jaw, and having its other end extended at 13 and seating in a notch 14 forming the side of the base plate 5.

For holding the jaws in said position, a lever 14' is provided comprising, in the present instance, a single length of wire bent in substantially rectangular shape and having its ends engaged in lugs 15 bent outwardly from the side edge portions of one of the bearing ears 6. The frame thus provided is engageable by the bill of an upturned hook 16 formed on one end of a bar 17 pivoted at said end to a lug 18 upstanding from the base plate, and extending longitudinally of the base plate and having its other ends engageable selectively in one of a series of notches 19 formed in a trigger bar 20 connected with the central portion of the base plate by a swivel bolt 21 having an eye loosely engaged in the apertured lower end of the trigger bar whereby the trigger bar is afforded free movement in any direction. The series of notches 19 afford variable leverage for the trigger bar, whereby it may be set to require differing degrees of force for its displacement. A bait hook 22 is formed at the upper end of the trigger bar.

Thus in operation, movement of the trigger bar by an animal endeavoring to procure the bait thereof would release the bar 17 and consequently the jaw holding lever 14', permitting said jaws to snap together. An exceedingly simple, efficient and readily manipulated device has thus been provided, wherein the danger of inoperativeness due to freezing of various trigger portions to each other or to the body plate, is prevented, since the trigger bar which projects directly upward is afforded sufficient leverage to break from any freezing contact which might occur at its base, and since a spring upward pressure is exerted upon the bar 17 and lever frame 14' upon release of the former from the trigger bar, which would break any freezing connection which might occur, except under the most severe conditions.

It will however be noted that an ordinary pan trigger may be substituted for the upstanding trigger bar 20, and in the modification of Fig. 4, the outer side of the lever frame 16 is engageable in a notch 23 formed in the angle portion of an angular bar 24 having a short depending arm pivoted to a lug 25 on the base plate, and having a relatively long arm extending inwardly of the trap and carrying a bait pan 26 whereby upon pressure of the bait pan the jaw holding lever will be released. One end of the shaft 7 is flattened and apertured to form an attaching eye 27 for an ordinary securing chain 28, and this eye also prevents displacement of the shaft, the other end of the shaft being preferably provided with a cotter pin 29.

What is claimed is:

1. A trap including a base plate, a shaft journaled on the base plate, a pair of substantially U-shaped jaws having their ends pivotally mounted on the shaft, a lever pivoted to the base plate and extensible across the jaws, trigger means for holding the lever across the jaws, coil springs mounted on the shaft and one end of each coil spring being engageable with the base plate and its other end being engageable with one of the jaws.

2. A trap including a base plate having its end portions laterally directed, a shaft mounted on said laterally directed end portions, a pair of U-shaped jaws having their ends pivotally mounted on the shaft, coil springs mounted on the shaft and each having one end engageable with the base plate and its other end engageable with one of the jaws and trigger controlled means for holding the jaws against the action of the springs.

3. A trap including a base plate, jaws pivotally connected with the base plate, resilient means urging said jaws together, a lever pivotally connected with the base plate outwardly of the jaws and extensible across one of the jaws, a bar pivoted to the base plate and having a hook portion at one end engageable with said lever, and an upstanding trigger bar loosely mounted on the base plate and provided with a notch in one side for receiving the other end of the bar.

In testimony whereof, I affix my signature, in the presence of two witnesses.

GLENDON W. STEPHENS.

Witnesses:
RALPH T. PARKER,
EUNICE L. LYFORD.